United States Patent [19]
Nemazie et al.

[11] Patent Number: 5,455,721
[45] Date of Patent: Oct. 3, 1995

[54] METHOD AND APPARATUS FOR AUTOMATIC SECTOR PULSE GENERATION AND SPLIT FIELD CALCULATION IN DISK DRIVES

[75] Inventors: Siamack Nemazie, San Jose; Petro Estakhri, Pleasanton, both of Calif.; John Schadegg, Niwot, Colo.

[73] Assignee: Cirrus Logic, Inc., Fremont, Calif.

[21] Appl. No.: 205,625

[22] Filed: Mar. 3, 1994

[51] Int. Cl.$^6$ .................................................. G11B 5/09
[52] U.S. Cl. ............................................... 360/51; 360/48
[58] Field of Search ........................... 360/77.14, 77.02, 360/77.05, 77.08, 40, 48, 49, 69, 51

[56] References Cited

U.S. PATENT DOCUMENTS

| | | | |
|---|---|---|---|
| 3,375,507 | 3/1968 | Gleim et al. | 340/174.1 |
| 4,297,737 | 10/1981 | Andresen et al. | 360/135 |
| 4,498,146 | 2/1985 | Martinez | 364/900 |
| 4,507,693 | 3/1985 | Matsuda et al. | 360/72.2 |
| 4,656,532 | 4/1987 | Greenberg et al. | 360/48 |
| 4,827,423 | 5/1989 | Beasley et al. | 364/468 |
| 4,914,530 | 4/1990 | Graham et al. | 360/48 |
| 4,924,331 | 5/1990 | Robinson et al. | 360/72.1 |
| 4,935,825 | 6/1990 | Worrell et al. | 360/54 |
| 4,999,720 | 3/1991 | Wilson et al. | 360/40 X |
| 5,075,804 | 12/1991 | Deyring | 360/49 |
| 5,089,757 | 2/1992 | Wilson | 360/77.02 |
| 5,111,444 | 5/1992 | Fukushima et al. | 369/58 |
| 5,172,381 | 12/1992 | Karp et al. | 371/42 |
| 5,200,864 | 4/1993 | Dunn et al. | 360/48 |
| 5,200,959 | 4/1993 | Gross et al. | 371/21.6 |
| 5,227,930 | 7/1993 | Thomas et al. | 360/77.05 X |
| 5,235,585 | 8/1993 | Bish et al. | 369/54 |
| 5,255,136 | 10/1993 | Machado et al. | 360/77.02 |
| 5,270,877 | 12/1993 | Fukushima et al. | 360/48 |
| 5,270,979 | 12/1993 | Harari et al. | 365/218 |
| 5,271,018 | 12/1993 | Chan | 371/10.2 |
| 5,274,509 | 12/1993 | Buch | 360/48 |

*Primary Examiner*—Donald Hajec
*Assistant Examiner*—Le Thien Minh
*Attorney, Agent, or Firm*—Haverstock, Medlen & Carroll

[57] ABSTRACT

A method and apparatus for automatic sector pulse generation and split field calculation in disk drives without the use of tables improves the seek latency of a disk drive system because it does not have to wait for the INDEX mark or the beginning of a frame, before beginning an operation it has been instructed to perform. The system can be designed to start from any point on the disk and begin calculations as if it were starting from the INDEX mark or the beginning of a frame. The calculations performed for each servo mark calculate the number of sectors and split fields which can be stored between servo marks on the disk. Multiple calculations can be performed between two servo marks. A counter is used to keep track of the number of servo marks for which the system has performed calculations. This counter is compared to the number of the last previously detected servo mark. The system continues to perform the calculations for each servo mark until the counter is equal to the number of the previously passed servo mark. At this point the system is synchronized and can perform the operation that it was instructed to perform, either format, read or write. The system can also be instructed to wait for the INDEX mark or the beginning of the next frame if the system is not compatible with the fast forward method.

31 Claims, 11 Drawing Sheets

| ID PLO | ID AM | ID | CRC | GAP | DATA PLO | DAM | DATA | ECC | PAD |

| Index Flag | Next Frame Flag | Fast Forward Flag | PS | Next Event |
|---|---|---|---|---|
| 1 | - | - | - | Wait for INDEX |
| 0 | 1 | - | - | Wait for next Frame |
| 0 | 0 | 1 | - | continue until COUNT = SMCnt |
| 0 | 0 | 0 | 0 | Wait for SAC = $\Delta$ |
| 0 | 0 | 0 | 1 | Wait for SM |

| NS | N_SPF | |
|---|---|---|
| 1 | 0 | After next event wait for SM high and on SM low enable SECTOR |
| 1 | 1 | After next event wait for SM high |

All Operations (result of operations always stored in C)
R1 ← R2
R1 ← R2 - 1
R1 ← R1 + R2
R1 ← R1 - R2
R1 = { C, SAR, DTR, N_SPFCnt, DAR, DTRD }
R2 = { SSR, IDR, DPR, DER, ECC, HEADER, SSRD, IDRD, DPRD, ECCD, SAR, DTR, DAR, DTRD }
SIGN = Sign of result of operation
Z = result of operation equals zero

METHOD AND APPARATUS FOR AUTOMATIC SECTOR PULSE GENERATION AND SPLIT FIELD CALCULATION IN DISK DRIVES

FIELD OF THE INVENTION

The present invention relates to the control of storage systems for digital computers. More particularly, the present invention relates to automatic generation of a sector pulse, and automatic calculation of split field sizes for control of storage on a disk drive.

BACKGROUND OF THE INVENTION

An example of a magnetic media platter with embedded servo fields is illustrated in FIG. 1. These servo fields may also be referred to as servo bursts or servo marks. Each concentric circle schematically represents one track which is subdivided into multiple sectors and each radial line extending from the center outward, represents a servo field. A servo field contains data which is pre-written on the disk, during manufacturing of the disk, concerning the location of the servo field and the track on the disk for positioning of the read/write head relative to a particular track. The servo fields are then used by the controller for positioning of the read/write head during read and write operations. It is imperative therefore, that the data within the servo fields not be written over. In order not to write over the data within a servo field, the controller must know where the servo fields are and be able to suspend write operations over that area.

The usable regions for storage on the disk are located on the tracks, between the servo fields. Data to be stored on the disk is written in these regions between the servo fields, which will be referred to as a data region. The recording of data within these regions is measured in bits per inch (BPI). Assuming a constant bit density to record a bit the number of bits which can be recorded between servo fields is much less for the inner circle, track 0, than the number of bits which can be recorded in the outermost circle, track N. Though possible, it is impractical to provide a unique recording and reading speed for each track. In order to take advantage of the higher storage potential of the outer tracks without exceeding the allowable density on the inner tracks, the disk is divided into multiple zones and a method of zone bit recording is used. The tracks are grouped into zones such that all the tracks are spaced in close proximity to each other. The data rate at which data is written to or read from the disk is constant for all tracks within a zone and different for each zone. Because the disk is rotated at the same speed for all the zones, in order to take advantage of the greater recording area of the outer zones, the recording speed is increased for the outer zones on the disk.

The data to be stored on a disk is broken up into manageable portions called sectors. Multiple sectors are generally stored on each track. An example of a typical format of a sector is illustrated in FIG. 2. Each sector includes an ID field, a GAP field, a data field and a PAD field. The ID field is the unique identification tag for each sector in a track of a disk drive media and differentiates one sector from another. Within the ID field are four subfields, the ID PLO subfield, the ID AM subfield, the ID subfield and the CRC subfield. The ID PLO subfield is a multiple byte field of a known pattern which is used by the phase lock loop of the encoder/decoder (ENDEC) to synchronize to the incoming data stream. The ID AM subfield is one byte of a known pattern which is used by the drive controller to synchronize or align to the beginning of the ID subfield. This synchronization is necessary to align the disk controller to a data byte boundary, in order to differentiate each segment of data to a particular field. The ID subfield follows the ID AM subfield and contains the actual identification for the sector and consists of multiple bytes used to specify the address of the sector on the disk drive. The number of bytes within the ID subfield is at the discretion of the manufacturer of the disk drive and is controlled by the format of the particular disk drive used. The number of bytes within the ID subfield is the same for every sector and can comprise a cylinder high byte, a cylinder low byte, a sector number byte, a head number byte and a byte or two for defect management and to signify the end of the track. The ID subfield is then followed by a fixed number of error detection bytes in the CRC subfield which are used to detect any errors in the ID field. Some formats, referred to as ID_Less formats, do not use an ID field, but rather use a header subfield within the DATA field.

The GAP field is a fixed number of bytes which are used to separate the ID field from the DATA field. The DATA field includes a DATA PLO subfield, a DATA Address Mark DAM subfield, a DATA subfield and an error correction code (ECC) subfield. The DATA PLO subfield is a multiple byte field of a known pattern which is used by the phase lock loop of the encoder/decoder to synchronize to the incoming data stream. The DAM subfield is one byte of a known pattern which is used by the drive controller to synchronize or align to the beginning of the DATA subfield. The DATA subfield is the portion of the sector where the actual data, which is communicated between the host computer and the disk drive, is stored. The ECC subfield is a fixed number of bytes tagged on to the end of the DATA subfield which are used to detect and correct soft or hard errors on the media within the capability of the code. This is necessary in order to avoid the transfer of erroneous data to the host computer.

In ID_Less formats, the ID field is replaced by a header subfield within the DATA field, thus combining the ID field and the DATA field into one field and reducing the number of bits necessary for each sector. The ID field can be brought under the protection of the same ECC field as the DATA field and therefore afforded the same protection as the DATA field. The CRC field associated with the ID field can be decreased or eliminated, further reducing the overhead of the system and eliminating the hardware which generates the CRC field. In ID_Less formats, all of the information in the sector header may be predetermined by reading a small number of other sector headers on the track, usually one. The sync field or PLO field in an ID_Less format can be reduced in size or the reliability of the sync circuitry improved since the sync field will always occur immediately after a sector pulse. Because some automatic calculation methods of the prior art calculate the split field sizes before the data field sync detection, they may not fully support an ID_Less format.

Employing constant density recording on a media with embedded servo fields where the servo fields are prerecorded at fixed angular distances relative to each other, will usually result in a track format that periodically requires a sector to be split in order to fit in the usable regions in more than one servo field. In order to obtain optimal or near optimal utilization of the space between the servo fields on a disk it may be necessary for the fields within a sector to be split in order to accommodate a servo burst. It is desirable to determine the fields that are split and the split field size automatically, without intervention by the microprocessor controlling the disk drive. In the methods of the prior art a sector pulse was generated by a separate logic block or from the media itself. It is also desirable to generate a sector pulse automatically to signal the beginning of each sector.

The disk drive system performs three major operations on a disk inserted into the disk drive system. The disk drive can format the disk for storing data in the format supported by the system and the disk. The disk drive system also performs write operations to the disk to store data on the disk transmitted from the host computer to the disk drive system and read operations from the disk to read data from the disk and transmit it to the host computer. The disk is continuously rotating within the disk drive system, even as the read/write head moves between zones, which may cause the read/write head to cross over one or more servo fields as it travels from one track or zone to another track or zone. The controller circuit knows the angular position of the read/write head, but as the read/write head changes tracks between different zones, the number of sectors between servo marks changes, because of the change in bit density between zones. The controller does not know how to translate this angular position after a zone change into a known position on the track relative to the sectors and may be unable to determine the relative positioning of the sector pulses on the specific track. To re-orient itself on the disk, the hard disk controller will normally wait for the INDEX mark and orient itself from the INDEX mark for the track that it is on. However, waiting for the INDEX mark during a read or write operation increases the latency in reaching the next desired sector. This delay adds to the seek latency of the disk drive system.

An automatic method for determining the fields that are split and the split field size is used by Cirrus Logic, Inc. of Fremont, Calif. in Part Number CL-SH360. This method imposes some constraints on track format, specifically by only allowing the data subfield to be split and not allowing a split in the ID field, the GAP field and the ECC subfield. The length of the data split fields is stored within the ID field during format operation and used during read and write operations. In order to avoid intervention by the microprocessor controlling the drive during the format operation, the ID fields of the track are stored in a table in the drive buffer memory and read from the drive buffer memory during format operation. This method does not support automatic generation of the sector pulse.

Another automatic method for determining the fields that are split and the split field size is used by Adaptec, Inc. of Milpitas, Calif. in Part Number AIC-7110. This method is based on a timing signal to indicate the time when a servo field is present in order to suspend and resume the disk's format, read or write operations. This timing signal can be generated by circuitry external to the drive controller to indicate the time when a servo field is present in order to suspend and resume the operation of the disk. This timing signal must always be asserted within the same byte in a given sector. However, due to fluctuations in detecting the sector servo field, this method is not reliable.

The timing signal for the AIC-7110 can also be generated when an internal counter underflows. In this method constraints are also imposed on the track format by not allowing a split in the ID field. An internal counter is loaded from a first-in first-out stack (FIFO) with a number representing the number of bytes from the data field SYNC byte to the next servo field. The counter is then decremented upon detection or writing of a SYNC byte. When this counter becomes zero, the timing signal is generated and the counter is loaded from the FIFO again. Using this method, the counter can be loaded automatically from the ID field or by the microprocessor controlling the drive. If the counter is loaded by the microprocessor controlling the drive, frequent intervention is required by the microprocessor. The AIC-7110 does not support automatically generating the sector pulse.

Another automatic method for calculating split fields and split field size is taught by Machado et al. in U.S. Pat. No. 5,255,136 issued on Oct. 19, 1993. This method also embeds the split information within the ID field and therefore does not allow the ID field to be split. The split field information is stored in count bytes which are stored on a byte count stack within the sequencer and will be loaded into a byte counter of the sequencer to be used by the sequencer for sequencing data sectors to the disk surface or reconstructing the data sectors into unbroken continuous byte sequences. This method also does not support automatic generation of sector pulses.

Another method proposed by Estakhri et al. in U.S. patent application Ser. No. 07/904,804 filed on Jun. 25, 1992, calculates the split counts and delay from the servo sector field to the sector pulse algorithmically without any track format constraints. This method is restricted because it requires a first table to find the delay from the servo mark to the first sector pulse after the servo mark and a second table to find the physical sector number of the first sector after the servo mark if the read, write or format operation is not starting from the INDEX mark. If the two tables are not used, this method must start from the INDEX mark at the beginning of each track. The requirement of starting the disk operation from the INDEX mark adds on the average, one half of a disk revolution to the seek latency for this method. This will increase the seek latency an average of 5.5 msec to 8.3 msec depending on the disk drive system. This is not an acceptable delay for most applications. Because seek latency is a parameter which is used to compare the performance of disk drives, it is desirable to implement a method for split field calculation which will minimize the seek latency of the disk drive system without using a table. To avoid the increased latency associated with starting the disk operation from the INDEX mark, the two tables referred to above are used.

This method taught by Estakhri et al. also requires a free running clock operating at the disk data rate from the encoder/decoder. Also within this method there are implicit timing restrictions used to calculate split field sizes before data field sync detection, which may be a problem in the ID_Less formats depending on the clock that is used for the state machine executing the algorithm. This method does support formats in which the data field comprises a data subfield and an ECC subfield but must be extended to support formats in which the data field consists of a header subfield, a data subfield and an ECC subfield.

What is needed is a system which eliminates any real time intervention by the microprocessor controlling the disk drive for track processing. What is further needed is a system which also eliminates the embedding of split field information in the ID field of the sector in order to support systems which use an ID_Less format. What is also needed is a system which does not store the track/zone split field information and the sector pulse generator information in a table in the buffer memory of the disk drive. What is still further needed is a system which supports various track format constraints such as the ID_Less format and other format constraints such as not splitting the ECC subfield or in the case of formats that use an ID field for the sector, not splitting the ID field.

SUMMARY OF THE INVENTION

A method and apparatus for automatic sector pulse generation and split field calculation in disk drives without the use of tables improves the seek latency of a disk drive system because it does not have to wait for the INDEX mark or the beginning of a frame, before beginning an operation it has been instructed to perform. The system can be designed to start from any point on the disk and begin calculations as if it were starting from the INDEX mark or the beginning of a frame. The calculations performed for each servo mark calculate the number of sectors and split fields which can be stored between servo marks on the disk. Multiple calculations can be performed between two servo marks. A counter is used to keep track of the number of servo marks for which the system has performed calculations. This counter is compared to the number of the last previously detected servo mark. The system continues to perform the calculations for each servo mark until the counter is equal to the number of the previously passed servo mark. At this point the system is synchronized and can perform the operation that it was instructed to perform, either format, read or write. The system can also be instructed to wait for the INDEX mark or the beginning of the next frame if the system is not compatible with the fast forward method.

BRIEF DESCRIPTION OF THE DRAWINGS

FIG. 5 shows a timing diagram which illustrates the operation of the method and apparatus of the present invention.

DETAILED DESCRIPTION OF THE PREFERRED EMBODIMENT

Figures 1, 2:
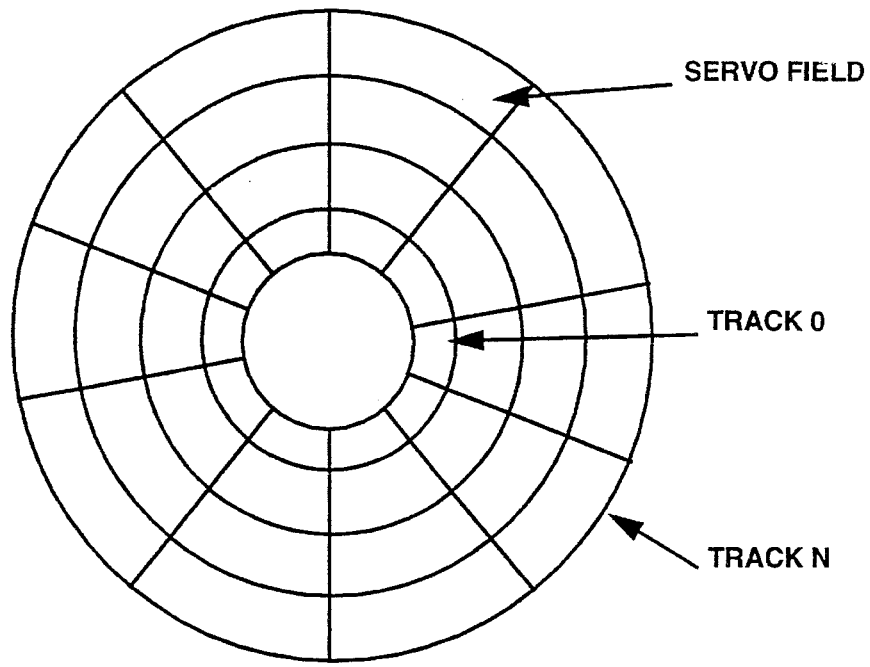
FIG. 1 illustrate an example of a magnetic media platter of the prior art with embedded radial servo fields and circular tracks.
FIG. 2 illustrates the fields and subfields of a typical sector of the prior art.

The method of the present invention reduces the seek latency of the disk drive system, without using tables, over methods of the prior art, because it does not have to wait for the INDEX mark in order to begin calculating the split fields for the sectors which are positioned between two servo fields, but rather, begins the calculation for the split fields from the servo mark where it is positioned as if that servo mark is the INDEX mark for that track. A counter representing the number of servo marks for which the counter has performed calculations, is compared to the number of the last previously detected servo mark. The number of the last previously detected servo mark is known by the controller. The controller, once initialized, will keep track of the angular position of the read/write head with respect to the disk and will maintain the number of the last servo mark. The amount of time that it takes the disk drive system to travel from one servo mark to the next is much greater than the amount of time that it takes to calculate the number of sections and the split field values for the data to be stored between the servo marks. Therefore, the calculations for multiple servo marks can be performed during the time that it takes the system to travel from one servo mark to the next servo mark.

During zone changes, as stated above, the disk drive controller may lose track of the relative position of the sector on the disk. In order to re-orient the controller on the disk, the method of the present invention begins from the first servo mark that it comes to as if this servo mark were the INDEX mark. If this servo mark is the INDEX mark, then the controller begins the operation that it has been instructed to do, either format, read or write. If this servo mark is not the INDEX mark, then the counter is reset to zero and the calculations for the delays from the end of the servo mark to generate the sector pulse and for the split fields associated with each sector are performed. The counter is then incremented and compared to the number of the last previously detected servo mark. If the counter still does not equal the number of the last previously detected servo mark then the calculations are performed for the next servo mark and the counter is again incremented. This process is repeated until the counter equals the number of the servo mark that has just been passed. As each servo mark is passed, the number of the servo mark that has just been passed is updated. Once the counter and the number of the last servo mark are equal, the controller is notified that the system is synchronized and at the next servo mark, sector pulse generation is enabled and the controller can begin the operation that it was instructed to do, either format, read or write.

The seek latency of the method of the present invention is improved over the prior art because the method of the present invention does not wait for an INDEX mark before beginning calculations for the sector marks. Where the methods of the prior art waited for the INDEX mark or required use of a table, the method of the present invention does not have to wait for the INDEX mark, but rather can start from any point on the disk and will be synchronized within a few servo marks. The method of the present invention also does not require use of a table or buffer for storing the values for each servo mark because they are calculated as the system is being synchronized.

The present invention can also be implemented utilizing a frame method which imposes a track format constraint on the disk drive system. Using the frame method, instead of automatically starting as if the system were at the INDEX mark, the system would start calculating as if it were at the beginning of a frame, which consists of a predetermined number N of sectors. Each frame will contain the same number N of sectors and will be formatted for storing data in the same manner.

The frame method adds a periodicity to the operation of the system by requiring that, starting from the INDEX mark, after every N sectors, the next sector must begin after the next servo mark, even if there is enough space left to have a split field. This track format constraint causes repetition in the track format, because starting from the INDEX mark, after every N sectors or equivalently M servo marks, the format repeats itself. The frame method therefore divides the track up into groups of sectors, wherein each group contains the same number of sectors and servo marks as every other group. The calculations for the generation of sector pulses and split fields for each frame are the same. Using the frame method may cause some space on the track to be wasted after the last sector of the frame, before the next servo mark, because the next sector must start after the next servo mark.

Using the method of the present invention as described above with a frame allows the calculations to start as if the present servo mark was the beginning of the frame. The calculations are then continued for the subsequent servo mask until the counter equals the servo mark count within the frame. Because the frames are smaller than the track, the system will be synchronized within the frame reducing the seek latency of the system significantly.

To allow flexibility to the system, the method of the present invention can also support waiting until an INDEX mark or the beginning of a frame is detected rather than synchronizing the system before an INDEX mark or the beginning of the frame is detected, if desired by the manufacturer of the disk drive system. If the system is designed to wait for an INDEX mark which is an external input, an average latency of the time it takes the system to rotate through one-half of the disk is added to the system. An assumption is that the INDEX mark is asserted within a time delay Δ from the previous servo mark. In most cases this assumption is met and the INDEX mark is asserted within the time delay Δ from the previous servo mark. If the delay from the servo mark before the INDEX mark, to the assertion of the INDEX mark is larger than allowed, then the usable area between the servo mark must be reduced. In the method of the present invention this difference is stored in the registers IXR and IXRD and is used to reduce the usable space between the INDEX mark and the next servo burst. If the system is designed to wait for the INDEX mark which is generated automatically, the INDEX signal will be generated within a time delay of n clock cycles after the falling edge of the servo mark and asserted for sixteen clock cycles.

The apparatus and method of the present invention are designed to use two clocks in order to avoid storing values in a table. The calculations are performed twice, once corresponding to a fixed, free-running clock SCLK and once corresponding to a data rate clock DCLK. The fixed, free-running clock SCLK remains constant no matter which zone and track the system is operating in. The data rate clock DCLK will vary depending on the zone and track that the system is operating in, to take advantage of the greater storage capacity of the outside tracks. Two clock frequencies are required for the system of the present invention because current commercially available encoder/decoders (ENDECs) do not provide a free-running clock at the disk data rate. To avoid this problem, the two clocks are used and calculations are performed for each clock. The data rate clock DCLK can be idle before an operation, but is started and will be free-running at the beginning of the operation.

The present system is designed to always look ahead by performing the split field calculations for the sector after an event before the system has reached that point. An event can be an INDEX mark, the beginning of the next frame, a servo mark or a sector mark. Once the calculations are performed for the next state, the system waits for the event to happen. After the event, the calculations for the next state are loaded into present state registers and flags and calculations for the next state are performed. The system repeats this process, always calculating ahead for the next state.

Figures 3, 4:
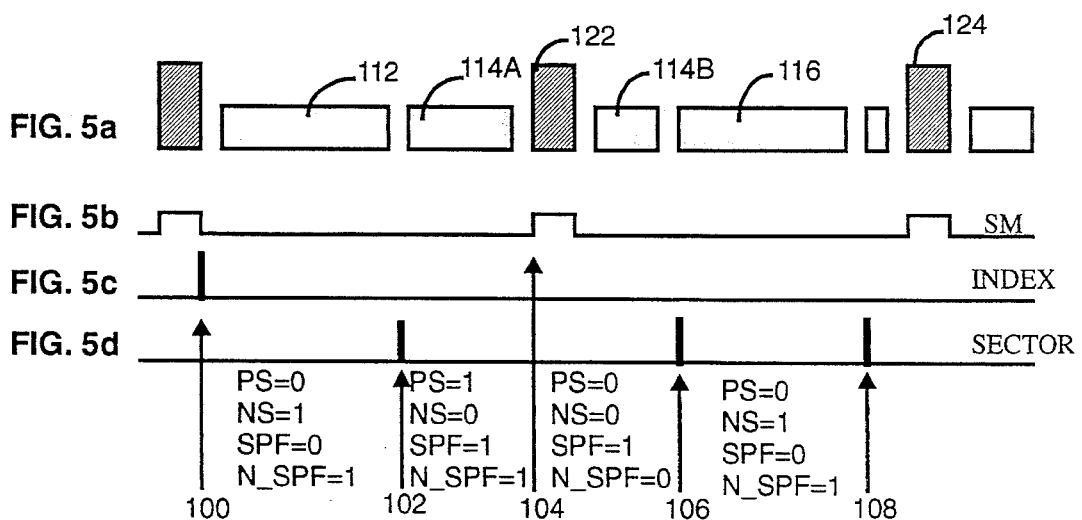
FIG. 3 illustrates a table showing different conditions for the system and the next event for each of these conditions.
FIG. 4 illustrates a table showing the next state conditions and what happens for each condition after the next event.

A table illustrating different conditions and what the next event is for each of those conditions is shown in FIG. 3. An INDEX_Flag, when it is set at a logical high voltage level, signals that the system has been designed to wait for the INDEX mark before beginning an operation. A NEXT_FRAME_Flag, when it is set at a logical high voltage level, signals that the system has been designed to wait for the beginning of the next frame before beginning an operation. A FAST_FORWARD_Flag, when it is set at a logical high voltage level, signals that the system is not designed to wait for either the INDEX mark or the beginning of the next frame and that the system should continue to perform calculations for each sector arid servo mark until the system is synchronized. A PS or present state flag, when it is set at a logical high voltage level, signals that no sector pulse should be generated until after the next servo mark. Therefore, if the PS flag is set at a logical high voltage level, the next event is the next servo mark, but if the PS flag is reset at a logical low voltage level, the next event is the next sector pulse.

FIG. 4 illustrates a table showing the next state conditions and what happens for each condition after the next event. A NS flag stores the value for the PS flag until the happening of the next event. When the next event occurs the value from the NS flag is stored in the PS flag. A N_SPF flag signals that the sector after the next event will be split. When the next event occurs the value from the N_SPF flag is stored in a corresponding present state SPF flag.

FIG. 5 shows a timing diagram which illustrates the operation of the method and apparatus of the present invention. After the INDEX mark 100, either detected or calculated, the values for the sector 112 are loaded from the next state flags and registers into the present state flags and registers. The PS and SPF flags are both reset at a logical low voltage level because a sector pulse can be generated before the next servo mark and the sector 112 is not to be split. The calculations are also now performed for the next sector 114. Because the entire next sector 114 will not fit before the next servo mark 122 and will have to be split, the NS flag and the N_SPF flag are both set to a logical high voltage level. Because the PS flag is at a logical low voltage level, the next event as determined from the table of FIG. 3 is to wait for a sector pulse.

Once the sector pulse 102 has been generated, the present state flags and registers are loaded with the values from the next state flags and registers. Because it was determined that the sector 114 will be split and no sector pulse can be generated until after the next servo mark, the PS and the SPF flags are both equal to a logical high voltage level. The calculations are then performed for the conditions after the next event. After the sector pulse 102, because the PS flag is at a logical high voltage level, the next event as determined from the table of FIG. 3 is to wait for a servo mark. After the next event the remainder of the sector 114B is positioned after the servo mark 122 and there is room for at least a portion of the next sector before the next servo mark 124. Therefore the NS flag is reset to a logical low voltage level signalling that a sector pulse can be generated after the next event and the N_SPF flag is set to a logical high voltage level signalling that there is still a portion of the sector 114B after the servo mark 122.

Once the servo mark 104 is detected, the present state flags and registers are loaded with the values from the next state flags and registers. Because the part of the sector 114B is placed after the servo mark 122, but a sector pulse can be generated at the next event, the SPF flag is at a logical high voltage level and the PS flag is at a logical low voltage level. The calculations are performed for the next sector 116 and it is determined that the entire sector 116 will fit before the next servo mark 124. Therefore the NS flag is set to a logical high voltage level signalling that a sector pulse can be generated after the next event and the N_SPF flag is reset to a logical low voltage level signalling that the sector 116 will not have to be split. Because the PS flag is reset to a logical low voltage level, the next event which the system will wait for is a sector pulse.

Once the sector pulse 106 is detected, the present state flags and registers are loaded with the values from the next state flags and registers. The calculations are then performed for the next sector and the system continues calculating for each sector one event ahead of when that sector occurs.

Figure 6:
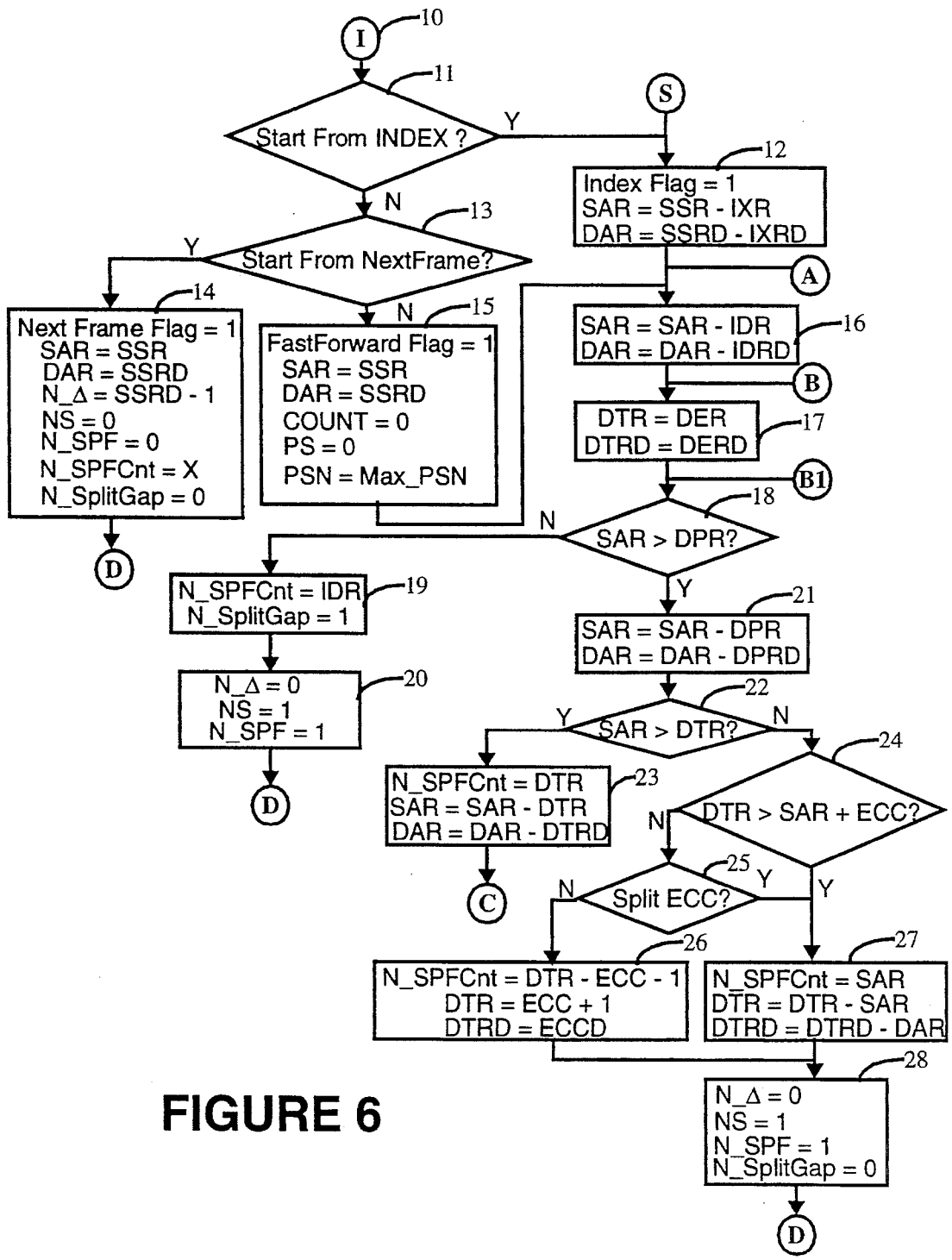
FIG. 6 illustrates a flow diagram for the method of the present invention.

A flow diagram illustrating the specific steps of the present invention is included in FIG. 6. The flow diagram begins from the Block 10. At the Block 11 the system determines if it is to wait and start from the INDEX mark. If it has been specified that the system is to wait and start from the INDEX mark, then the instructions at the block 12 are executed. The SAR register is a sixteen bit register which stores the number of bytes remaining before the next servo burst. The SSR register is a sixteen bit register which stores the number of usable bytes between servo bursts for the zone. The IXR register stores the delay from the servo mark to the assertion of the INDEX mark if the INDEX mark is not asserted within the time delay Δ. The SAR register, the SSR register and the IXR register are all controlled by the data rate clock DCLK. The DAR register, the SSRD register and the IXRD register each correspond to the SAR register, the SSR register and the IXR register, respectively, but are controlled by the fixed, free-running clock SCLK.

At the Block 12, if the INDEX mark is not asserted within the time delay Δ, the number of usable bytes before the next servo burst is reduced by subtracting the contents of the IXR register from the contents of the SSR register. The result of this operation is stored in the SAR register. If necessary, the contents of the IXRD register are correspondingly subtracted from the contents of the SSRD register and the result is stored in the DAR register. The system then sets the INDEX_Flag to a logical high voltage level and goes to point A in the program. At the point A the system begins calculations for the sector after the event, which in this case is an INDEX mark. The INDEX_Flag signals that the system is designed to wait for the next INDEX mark.

If the system is not designed to start from the INDEX mark, it is next determined if the system is designed to wait and start from the beginning of the next frame at the Block 13. If the system is designed to wait and start from the beginning of the next frame, then the instructions at the Block 14 are executed. At the Block 14 the NEXT_FRAME Flag is set to a logical high voltage level, signalling that the system is designed to wait and start from the beginning of the next frame and the number of usable bytes before the next servo burst, from the SSR register, is stored in the SAR register. Correspondingly, the contents of the SSRD register are stored in the DAR register. The contents of the SSRD register are decremented and the result is stored in the N_Δ register, the NS flag, the N_SPF flag and the N_SPLITGAP flag are all reset to a logical low voltage level and the next split field count value N_SPFCNT is set to a don't care value. The system then jumps to the beginning of the subroutine D, which is illustrated in FIG. 8 and will be discussed in detail below.

If the system is not designed to start from the INDEX mark or the next frame, then the instructions in the Block 15 are executed. At the Block 15, the FAST_FORWARD flag is then set to a logical high voltage level, signalling that the system is designed to work in the fast forward mode and the number of the usable bytes before the next servo burst from the SSR register is stored in the SAR register. Correspondingly, the contents of the SSRD register are stored in the DAR register. The value stored in the COUNT register is reset to zero, the PS flag is reset to a logical low voltage level and the maximum physical sector number MAX_PSN is stored in the physical sector number register PSN. Because the system is designed to work in the fast forward mode, it then goes to the point A in the program and begins calculations for the sector after the event, as if the next event was an INDEX mark.

Once it has been determined which mode the system is operating in, at the point A in the program, the system proceeds to perform calculations for the next sector, following the event. At the Block 16, the system subtracts the number of bytes in an ID field from the number of remaining usable bytes before the next servo burst. The IDR register is an eight bit register which holds the number of bytes contained in the PLO subfield, the ID AM subfield, the error detection field CRC and the GAP field. The IDR register is controlled by the data rate clock DCLK. The IDRD register is a register corresponding to the IDR register which is controlled by the fixed, free-running clock SCLK. The contents of the IDR and IDRD registers are fixed and remain the same for all sectors on the same track. The contents of the SAR register, which contains the number of remaining bytes before the next servo mark are reduced by the contents of the IDR register, effectively subtracting the number of bytes in the ID field and the error correction field CRC of a sector from the number of bytes remaining until the next servo burst. The contents of the DAR register are correspondingly reduced by the contents of the IDRD register. If the system uses an ID_Less format then this step and the IDR and IDRD registers are not required.

At the Block 17 the value in the DER register is loaded in the DTR register and correspondingly the value in the DERD register is loaded in the DTRD register. The DER register is a sixteen bit register which holds the number of bytes in the DATA subfield and the error correction subfield ECC for the sector. The DER register is fixed and remains the same for all sectors. The DTR register is an internal sixteen bit data register used for calculations by the system, involving the DATA field. The DER and DTR registers are controlled by the data rate clock DCLK. The DERD and DTRD registers are corresponding registers which are controlled by the fixed, free-running clock SCLK. At the Block 17, the contents of the DER register are stored in the DTR register and the contents of the DERD register are stored in the DTRD register.

At the Block 18 it is determined if the DATA PLO subfield, the DAM subfield and the PAD field for this sector will fit before the next servo burst by comparing the contents of the DPR register to the contents of the SAR register. The DPR register is an eight bit register which holds the number of bytes which are used in the DATA PLO subfield, the DAM subfield and the PAD field for the sector. The value stored in the DPR register is compared to the value stored in the SAR register at the Block 18. If the value stored in the DPR register is greater than the value stored in the SAR register, then the whole sector will not fit before the next servo burst and must be split. The system then executes the instructions at the Block 19 setting the N_SPFCNT register equal to the number of bytes in the ID and CRC fields and setting the N_SPLITGAP flag to a logical high voltage level indicating the next GAP field will be split. The N_SPFCNT register is an eight bit register which stores the number of bytes of the sector which were stored before the split.

At the Block 20, the N_Δ register is reset so that it is equal to zero, and the NS flag and the N_SPF flag are both set to a logical high voltage level. The N_Δ register stores the delay in terms of the fixed, free-running clock SCLK, from the next event to the generation of the next sector pulse. When it is set, the NS flag signals that there will be a split in this sector and that a sector pulse should not be generated until after the next servo mark. When it is set, the N_SPF flag signals that there will be a split field after the next servo mark. The N_Δ register and the NS and N_SPF flags all correspond to next state calculations. The system of the present invention is always calculating ahead of where it is or where it thinks that it is, as explained above. The registers and flags which are proceeded by an N are kept until an event occurs, such as a servo mark or sector pulse. After the event occurs, the registers and flags for the next state are loaded into corresponding present state registers or flags.

From the Block 20, the program jumps to the subprogram D to wait until the event occurs. In this case, the event is the detection of the next servo mark. After detecting the servo mark in the subprogram D, the system stores the number of usable bytes between servo bursts in the SAR register and then jumps to the point B1 in the program and executes the instructions beginning from the Block 18.

At the Block 18, if the DATA PLO subfield, the DAM subfield and the PAD field will fit before the next servo burst, then the sector does not have to be split yet and the system executes the instructions at the Block 21. At the Block 21, the number of usable bytes before the next servo burst are reduced by the number of bytes stored in the DPR register and correspondingly, the contents of the DAR register are reduced by the value stored in the DPRD register, effectively reducing the number of bytes remaining before the next servo mark by the number of bytes in the DATA_PLO subfield, the DAM subfield and the PAD field.

Figure 7:
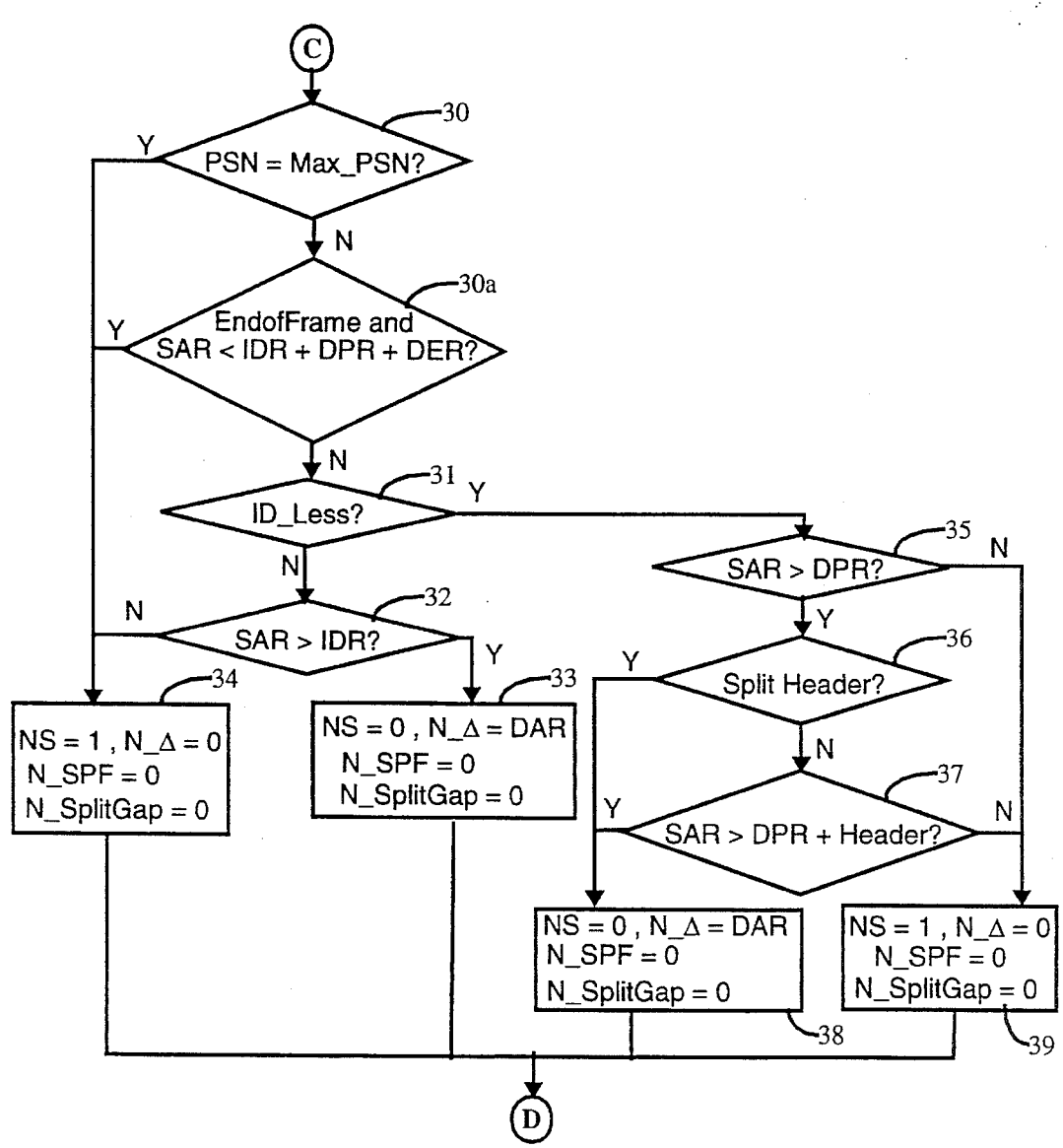
FIG. 7 illustrates a flow diagram for the subprogram C of the present invention.

At the Block 22, it is then determined if there is enough room for the DATA subfield and the ECC subfield before the next servo mark. The number of bytes remaining before the next servo mark is compared to the number bytes in the DATA subfield and the ECC subfield. If the number of bytes remaining before the next servo mark is greater than the number of bytes in the DATA and ECC subfields then the system executes the instructions at the Block 23. At the Block 23 the number of bytes in a DATA subfield and the ECC subfield is stored in the N_SPFCNT register, the number of bytes remaining before the next servo mark is reduced by the number of bytes in the DATA and ECC subfields and correspondingly the contents of the DAR register are reduced by the value stored in the DTRD register. After the Block 23, the program jumps to the beginning of the subprogram C, which is illustrated in FIG. 7, where it is determined if there is at least enough room before the servo mark for the ID and the CRC subfields of the next sector.

At the Block 22, if the number of bytes remaining before the next servo mark is not greater than the number of bytes in the DATA and ECC subfields then the system moves to the Block 24. At the Block 24, the system determines if the number of bytes in the DATA and ECC subfields is greater than the number of bytes remaining before the next servo mark and the number of bytes in the ECC subfield, effectively determining if the DATA subfield, without the ECC subfield, would fit before the next servo mark. If the number of bytes in the DATA subfield will not fit before the next servo mark, then the system next determines at the Block 25 whether this system has been designed so that the ECC subfield can be split from the remainder of the sector. If this system has not been designed so that the ECC subfield can be split, then the instructions at the Block 26 are executed. At the Block 26, the value stored in the DTR register is reduced by the number of bytes within the ECC subfield plus one and the result is stored in the N_SPFCNT register, the number of bytes within the ECC subfield plus one are stored in the DTR register and correspondingly the value ECCD is stored in the DTRD register. After the Block 26, the program then jumps to the Block 28.

At the Block 24, if the number of bytes in the DATA and ECC subfield will not fit before the next servo mark, then the program jumps to the Block 27. At the Block 25, if the system has been designed to split the ECC field, then the program also jumps to the Block 27. At the Block 27 the number of usable bytes before the next servo mark is stored in the N_SPFCNT register, the contents of the DTR register are reduced by the number of usable bytes before the next servo mark and correspondingly the contents of the DTRD register are reduced by the value stored in the DAR register. After the Block 27, the program will also continue to the Block 28.

At the Block 28, the N_Δ register is reset to a value of zero, because no sector pulse will be generated after the next event and the NS flag and the N_SPF flag are both set to a logical high voltage level signalling that there is a split in this sector and there will be a split field after the next event, in this case a servo mark. Also at the Block 28 the N_SPLITGAP flag is reset to a logical low voltage level. After the instructions at the Block 28 are executed, the program jumps to the subprogram D, illustrated in the FIG. 8, to wait for a servo mark.

The subprogram C is illustrated in FIG. 7. In the subprogram C, it is determined whether or not there is enough space remaining before the next servo mark to place enough information to constitute splitting a field. If the system uses an ID field it is determined in the subprogram C if at least the ID field and the CRC field will fit before the next servo mark. If the ID field and the CRC field will fit before the next servo mark then the program jumps to the subprogram D to wait for the next event, in this case the next sector pulse. After the next sector pulse has been detected and the values from the next state flags and registers have been loaded into the present state flags and registers, the program then jumps to the point A and performs the calculations for the next sector. If the ID field and the CRC field will not fit before the next servo mark, then the program jumps to the subprogram D and waits for the next servo mark. Once the next servo mark is detected and the values from the next state flags and registers are loaded into the present state flags and registers, the program jumps back to the point A after loading the SAR register with the number of usable bytes between servo bursts, to perform the calculations for the next sector.

If the system does support the ID_Less format it is then determined if the DATA PLO subfield, the DAM subfield and the PAD field will fit before the next servo mark. If the DATA PLO subfield, the DAM subfield and the PAD field will not fit before the next servo mark, then the program jumps to the subprogram D and waits for the next servo mark. If the DATA PLO subfield, the DAM subfield and the PAD field will fit before the next servo mark, it is then determined if the system allows the header to be split. If the system does not allow the header to be split, it is then determined if the DATA PLO subfield, the DAM subfield, the PAD field and the header will fit before the next servo mark. IF the DATA PLO subfield, the DAM subfield, the PAD field and the header will not fit before the next servo mark, the program then jumps to the subprogram D and waits for the next servo mark. Once the next servo mark is detected and the values from the next state flags and registers are loaded into the present state flags and registers, the program jumps back to the point A after loading the SAR register with the number of usable bytes between servo bursts, to perform the calculations for the next sector. If it is determined that the header can be split or if the DATA PLO subfield, the DAM subfield, the PAD field and the header will fit before the next servo mark, the program then jumps to the subprogram D to wait for the next event, in this case the next sector pulse. After the next sector pulse has been detected and the values from the next state flags and registers have been loaded into the present state flags and registers, the program then jumps to the point A and performs the calculations for the next sector.

Specifically, the subprogram C begins at the Block 30 where it is determined if this is a new frame or if the physical sector number PSN is equal to the maximum physical sector number Max_PSN. If this is not a new frame and the physical sector number PSN is not equal to the maximum physical sector number Max_PSN, then it is determined at the Block 30a if this is the end of the frame and if the number of remaining bytes to the next servo mark SAR is less than the total of the values stored in the IDR register, the DPR register and the DER register. If the conditions at the Block 30a are true the system then jumps to the Block 24. If the conditions at the Block 30a are not true then it is determined at the Block 31 if the system has been designed to operate in an ID_Less format. If this is a new frame or if the physical sector number PSN is equal to the maximum physical sector number Max_PSN, then the instructions at the Block 34 are executed.

If the system is not designed to support an ID_Less format then it is determined at the Block 32 if the number of bytes remaining before the next servo mark is greater than the number of bytes in the ID and CRC subfields. If the number of bytes remaining before the next servo mark is greater than the number of bytes in the ID and CRC subfields, then the instructions at the Block 33 are executed. At the Block 33, the N_Δ register is set equal to the contents of the DAR register, and the NS flag, the N_SPF flag and the N_SPLITGAP flag are all reset to a logical low voltage level. After the Block 33 the program then jumps to the beginning of the subprogram D to wait for the generation of the next sector pulse.

If this is a new frame or the physical sector number PSN is equal to the maximum physical sector number MAX_PSN or the number of bytes remaining before the next servo mark is not greater than the number of bytes in the ID and CRC subfields, then the instructions at the Block 34 are executed. At the Block 34, the N_Δ register is reset to zero, the NS flag is set to a logical high voltage level and the N_SPF flag and the N_SPLITGAP flag are reset to a logical low voltage level. After the instructions in the Block 34 are executed the program then jumps to the beginning of the subprogram D to wait for the next servo mark.

At the Block 31, if the system has been designed to work in an ID_Less format, it is next determined at the Block 35 if the number of bytes remaining before the next servo mark is greater than the number of bytes in the DATA PLO subfield, the DAM subfield and the PAD field. If the number of bytes remaining before the next servo mark is not greater than the number of bytes in the DATA PLO subfield, the DAM subfield and the PAD field, then the program jumps to the Block 39 and executes the instructions at that Block. If the number of bytes remaining before the next servo mark is greater than the number of bytes in the DATA PLO subfield, the DAM subfield and the PAD field, then it is next determined at the Block 36 if this system has been designed so that the sector header can be split. If this system has been designed so that the sector header can be split, then the instructions at the Block 38 are executed. If this system has not been designed so that the sector header can be split, then it is determined if the number of bytes remaining before the next servo mark is greater than the number of bytes in the DATA PLO subfield, the DAM subfield and the PAD field plus the number of bytes in the sector header. If the number of bytes remaining before the next servo mark is greater than the number of bytes in the DATA PLO subfield, the DAM subfield and the PAD field plus the number of bytes in the sector header, then the instructions at the Block 38 are executed. At the Block 38 the contents of the DAR register are stored in the N_Δ register and the NS, N_SPF and N_SPLITGAP flags are reset to a logical low voltage level. After the instructions are executed at the Block 38, the program then jumps to the beginning of the subprogram D to wait for the next event, in this case a sector pulse.

If the number of bytes remaining before the next servo mark is not greater than the number of bytes in the DATA PLO subfield, the DAM subfield and the PAD field plus the number of bytes in the sector header, then the instructions at the Block 39 are executed. At the Block 39, the N_Δ register is reset to zero, the NS flag is set to a logical high voltage level and the N_SPF flag and the N_SPLITGAP flag are reset to a logical low voltage level. After the instructions in the Block 39 are executed the program then jumps to the beginning of the subprogram D to wait for the next servo mark.

The subprogram D is illustrated in FIG. 8. At the Block 40 it is determined if the next event is an INDEX mark because the system has been designed to wait for the INDEX mark before beginning. If the system has been designed to wait for the INDEX mark, then it is next determined at the Block 46 if the leading edge of the INDEX mark has been detected yet. If the leading edge of the INDEX mark has not been detected yet, then the system waits at the Block 46 until the leading edge of the INDEX mark is detected. Once the leading edge of the INDEX mark has been detected, the system waits at the Block 47 until the trailing edge of the INDEX mark is detected. Once the trailing edge of the INDEX mark is detected, the program executes the instructions at the Block 48, then the INDEX_flag is reset to a logical low voltage level and the physical sector number counter PSN is reset to zero. It is next determined at the Block 49 if this system allows a sector pulse to be generated after the INDEX mark. If the system does allow a sector pulse to be asserted after the INDEX mark, then a sector pulse is asserted at the Block 50 and the program jumps to the point E, also illustrated in FIG. 8, and prepares for the calculations for the next event. If this system does not allow a sector pulse to be generated after the INDEX mark, then the program automatically jumps to the subprogram E.

If the system is not designed to wait for an INDEX mark at the Block 40, it is then determined at the Block 41 if the system is designed to wait for the beginning of the next frame. If the system is designed to wait for the beginning of the next frame, then the system waits at the Block 55a until the leading edge of the next servo mark. Once the leading edge has been detected the system then determines if the SMCNT counter is equal to a Target Servo Mark Count at the Block 55. The SMCNT counter stores the number of the servo mark which has just been passed. The Target Servo Mark Count is programmed by the user and contains the number of the sector mark at the beginning of the next frame. Alternatively, the Target Servo Mark Count could be programmed to contain the number of the sector mark at the end of the current frame. If the servo mark which has just been passed is not equal to the servo mark at the beginning of the next frame, then the system jumps back to the Block 55a and waits for the leading edge of the next servo mark. If the servo mark which has just been passed is equal to the servo mark at the beginning of the next frame, then the system waits at the Block 55b until the trailing edge of the servo mark and then the NEXT_FRAME flag is reset to a logical low voltage level at the Block 56 and the rSMCNT counter is enabled. The rSMCNT counter is a servo mark counter within the frame. After the instructions at the Block 56 have been executed the system then jumps to the point E in the subroutine and begins executing the instructions at the Block 59.

At the Block 41, if the system is not designed to wait for the beginning of the next frame, then it is determined at the Block 42 if the system is designed to use the fast-forward mode and start calculations as if the system were at the INDEX mark or the beginning of a frame and keep calculating until the system is synchronized. If the system is designed to use the fast-forward mode then it is determined at the Block 51 whether or not the PS flag is equal to a logical high voltage level, signalling that no sector pulse can be generated until after the next servo mark. If the PS flag is equal to a logical high voltage level then it is next determined at the Block 52 if the value stored in the COUNT register is equal to the value stored in the SMCNT register. The COUNT register stores the number of servo marks which the system has made calculations for and the SMCNT register stores the number of the last servo mark which was most recently passed over and which indicates where the system actually is on the track. If the value stored in the COUNT register is equal to the value stored in the SMCNT register, then the system waits at the Block 53a for the trailing edge of the servo mark. Once the trailing edge of the servo mark has been detected, it is then determined at the Block 53b if the value stored in the SMCNT register is equal to the value stored in the COUNT register. If the value stored in the SMCNT register is equal to the value stored in the COUNT register then the system jumps to the Block 54. If the value stored in the SMCNT register is not equal to the value stored in the COUNT register then the system waits at the Block 53c for the leading edge of the next servo mark. After the leading edge of the next servo mark has been detected the system waits at the Block 53d for the trailing edge of the servo mark. After the trailing edge of the servo mark has been detected then at the Block 54 the sector pulse generator is enabled, the FAST_FORWARD flag is reset to a logical low voltage level and the program jumps to the point E in the subprogram D. If the value stored in the COUNT register is not equal to the value stored in the SMCNT register then at the Block 53 the value stored in the COUNT register is incremented and the program jumps to the point E in order to prepare to begin calculations for the next event.

At the Block 51 if the PS flag is not equal to a logical high voltage level and a sector pulse can be generated, then at the Block 45, the Update_PSN flag is set to a logical high voltage level and the program jumps to the subprogram E. The Update_PSN flag signals that the physical sector number PSN can be incremented. At the Block 42 if the system has not been designed to operate in the fast forward mode or the system is already synchronized then it is determined at the Block 43 whether or not the PS flag is equal to a logical high voltage level signalling that no sector pulse can be generated until after the next servo mark. If the PS flag is equal to a logical high voltage level the system then waits at the Block 57 until the leading edge of the next servo mark is detected. Once the leading edge of the next servo mark has been detected the system waits at the block 58 until the trailing edge of the servo mark is detected. Once the trailing edge of the servo mark has been detected the program then jumps to the point E, to prepare to begin calculations for the next event. Once a servo mark has been detected the program then jumps to the point E to begin calculations for the next event.

At the Block 43 if the PS flag is not equal to a logical high voltage level then it is determined at the Block 44 if the value stored in the SAC counter is equal to the time delay Δ. The SAC counter is repetitively set at each servo burst with the number of byte positions storable between servo bursts, and counts down at the disk byte rate for that zone after a servo burst is detected. The system will wait at the Block 44 until the value stored in the SAC register is equal to the time delay Δ. Once the value stored in the SAC register is equal to the time delay A then at the Block 45 the Update_PSN flag is set to a logical high voltage level and the program jumps to the point E.

At the point E, beginning at the Block 59, the values stored in the next state registers and flags are stored in the corresponding present state registers and flags. The value stored in the N_Δ register is stored as the time delay Δ, the value in the N_SPFCNT register is stored in the SPFCNT register, the PS flag is set equal to the value of the NS flag, the value stored in the N_SPF register is stored in the SPF register and the SPLITGAP flag is set equal to the N_SPLITGAP flag.

At the Block 59a the value in the SPF register is loaded in the LD_SPF register and then, at the Block 60, it is determined if the PS flag is equal to a logical high voltage level, signalling that no sector pulse can be generated until after the next servo mark. If the PS flag is not equal to a logical high voltage level and a sector pulse can be generated then the program jumps back to the point A and begins executing the instructions at the Block 16 to perform the calculations for the next event. If the PS flag is equal to a logical high voltage level and no sector pulse can be generated until after the next servo mark then it is determined at the Block 61 if the SPF flag is equal to a logical high voltage level, signalling that there is a split field in this sector. If the SPF flag is not equal to a logical high voltage level then it is determined at the Block 63 if the physical sector number counter PSN is equal to the maximum physical sector number Max_PSN. If the physical sector number counter PSN is equal to the maximum physical sector number Max_PSN then the program jumps to the point S and begins calculations from the next INDEX mark. If the physical sector number counter PSN is not equal to the maximum physical sector number Max_PSN, then at the Block 64, the number of usable bytes between servo bursts less one is stored in the N_Δ register, the NS flag is reset to a logical low voltage level, the N_SPF flag is reset to a logical low voltage level, the N_SPFCNT register is set to a don't care value because there is no split field, the value stored in the SSR register is stored in the SAR register and the program jumps to the beginning of the subprogram D to wait for the next event, in this case the next servo mark. At the Block 61 if the SPF flag is equal to a logical high voltage level, then the value stored in the SSR register is stored in the SAR register and the program jumps to the point B1 and executes the instructions at the Block 18 to begin calculations for the next event.

The preferred embodiment of the present invention uses the fast forward method, performing calculations as if the system were starting from the INDEX mark. Calculations are then performed for each servo mark respectively, until the servo mark counter and the actual number of the servo mark which was just passed are the same. At this point the system is synchronized and can begin the operation which it was instructed to do, either format, read or write. This method is advantageous over any of the prior art methods because the seek latency for the system is reduced and the system does not have to wait for an INDEX mark before beginning the operation which it was instructed to do. Also with the use of this method no tables are required as all the calculations are performed while the system is being synchronized.

Figures 9, 10B:
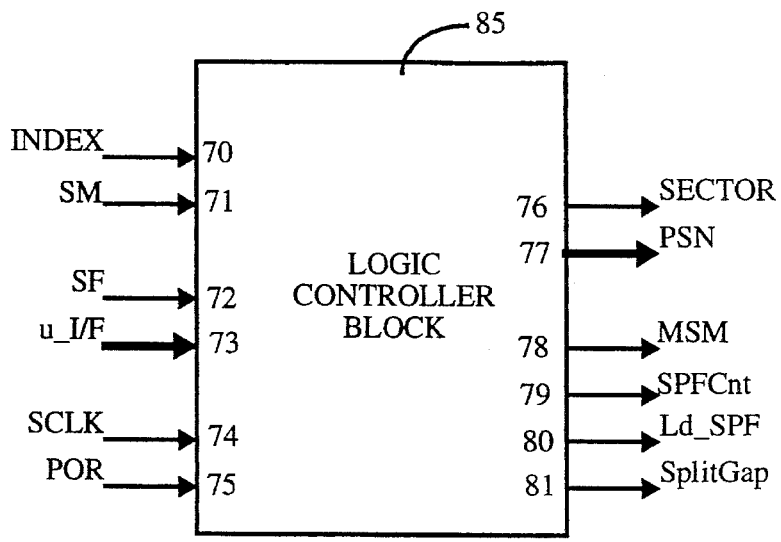
FIG. 9 illustrates the inputs to the controller logic and the outputs from the controller logic.
FIG. 10b illustrates the operation of the registers and arithmetic unit hardware.

The inputs to the controller logic block 85 and the outputs from the controller logic block 85 of the present invention are illustrated in FIG. 9. A signal line INDEX 70 is coupled as an input and an output to the controller logic block 85 illustrated in FIG. 7, depending on whether the system can generate an INDEX signal automatically. The servo mark input SM 71 is also coupled as an input to notify the controller logic block 85 when a servo mark has been detected. The signal line SF 72 is a servo fault signal line and is also coupled as an input to the controller logic block 85. The microcontroller interface μ-I/F bus 73 is coupled as an input to the controller logic block 85. The fixed, free-running clock signal SCLK is coupled as an input to the controller logic block 85. The power on reset signal line POR 75 is coupled as an input to the controller logic block 85.

The signal line SECTOR 76 is coupled as an output from the controller logic block 85 to signal when a sector pulse should be generated. The signal lines for the physical sector number counter PSN 77 are also coupled as an output from the controller logic block 85 to keep count of the physical sector number. The missing servo mark signal line MSM 78 is coupled as an output from the controller logic block 85. The signal lines for the split field counter SPFCNT 79 are coupled as an output from the controller logic block 85. The signal line LD_SPFCNT 80 is coupled as an output from the controller logic block 85 to signal when the split field count should be loaded. The split GAP signal line SPLIT_GAP 81 is also coupled as an output from the controller logic block 85 to signal when the next GAP field has been split. In the preferred embodiment of the invention the servo fault signal line SF 72 and the missing servo mark signal line MSM 78 are not included.

Figure 10A:
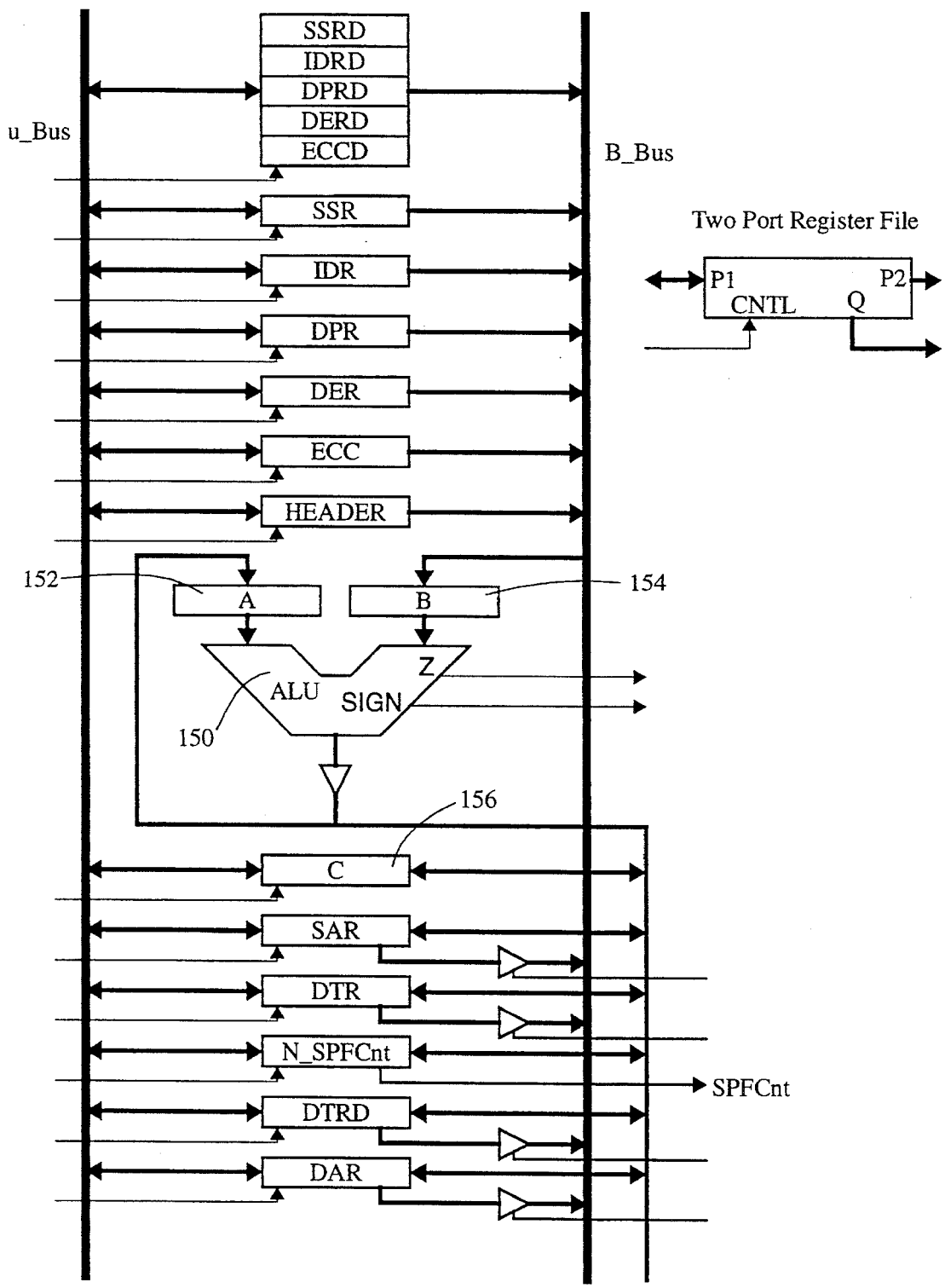
FIG. 10a illustrates the registers and arithmetic unit connections.

The registers and arithmetic unit hardware connections are illustrated in FIG. 10a. The operation of the registers and arithmetic unit hardware is illustrated in FIG. 10b. The arithmetic unit 150 performs the three operations listed at the bottom of FIG. 10: storing the contents of one register, taken from the set of the registers R1, into another register, taken from the set of the registers R2; decrementing the contents of a register, taken from the set of the registers R2 and storing the result in another register, taken from the set of the registers R1; and adding or subtracting values from two registers, one taken from the set of the registers R1 and the other taken from the set of the registers R2, and storing the result in another register, taken from the set of the registers R1. The values to be used by the arithmetic unit 150 are stored in the A and B registers 152 and 154 and the result of all of the operations performed by the arithmetic unit 150 are stored in the C register 156. The arithmetic unit also outputs the sign of the result of the operation just performed and will set the Z flag if the result of the operation is equal to zero.

Figure 11:
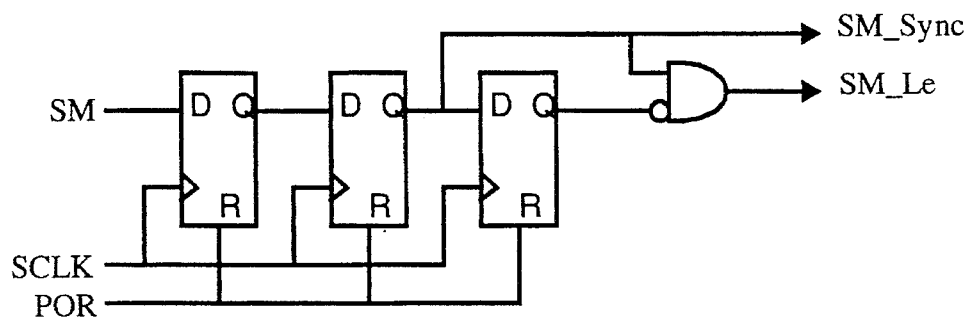
FIG. 11 illustrates the logic circuitry used to detect the leading edge of the servo mark and to synchronize the servo mark to the fixed, free-running clock SCLK.

FIGS. 11–15 illustrate the hardware schematics for the logic circuits used to generate the signals required by the apparatus for the preferred embodiment of the present invention. FIG. 11 illustrates the logic circuitry used to detect the leading edge of the servo mark and to synchronize the servo mark to the fixed, free-running clock SCLK. The logic circuitry of FIG. 11 uses the fixed, free-running clock SCLK as the clock signal for a series of flip-flops to generate a synchronized servo mark signal SM_Sync and a signal signifying the leading edge of the servo mark SM_Le.

Figure 12:
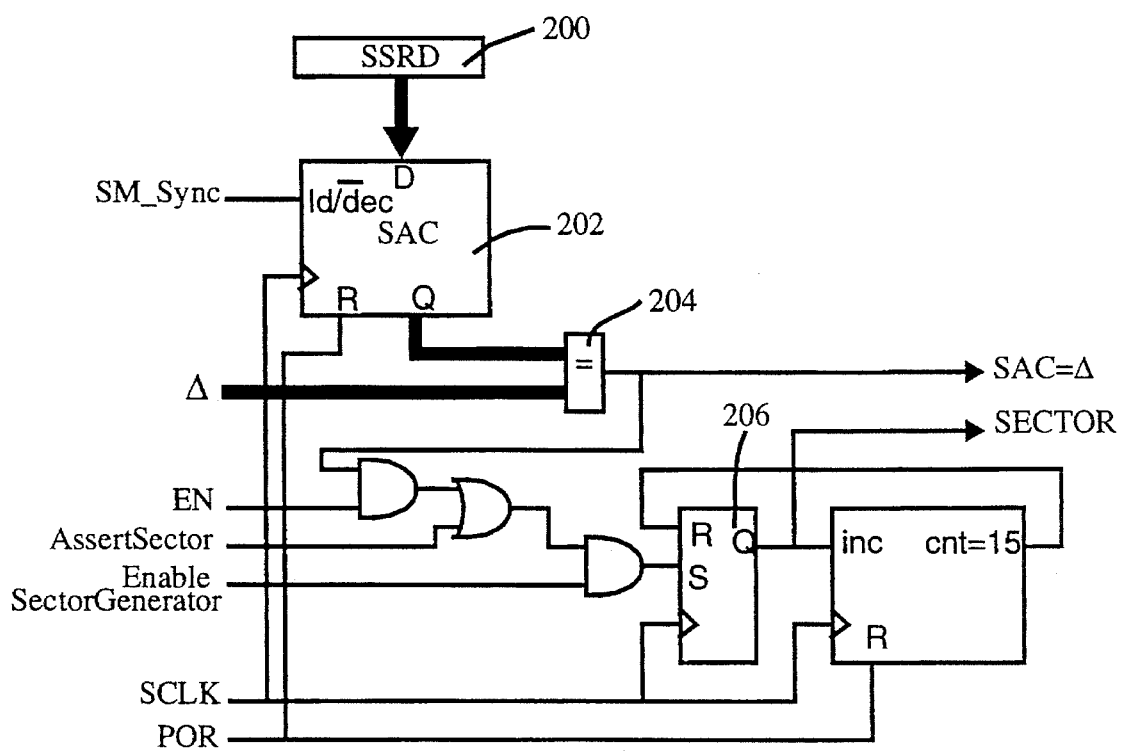
FIG. 12 illustrates the logic circuitry used to control the SAC counter, to compare the SAC counter to the time delay Δ and to generate the sector pulse.

FIG. 12 illustrates the logic circuitry used to control the SAC counter, to compare the SAC counter to the time delay Δ and to generate the sector pulse. The value from the SSR register 200 is loaded into the SAC counter 202 at each servo burst with the number of byte positions storable between servo bursts, and counts down at disk byte rate for that zone after a servo burst is detected. The comparator 204 then compares the value from the SAC counter with the time delay Δ. If the value stored in the SAC counter 202 is not equal to the time delay Δ, then the system waits until the value stored in the SAC register is equal to the time delay Δ. Once the value stored in the SAC register is equal to the time delay Δ then a sector pulse can be generated if the sector pulse generator is enabled. A sector pulse can also be generated when the Assert_Sector signal line is at a logical high voltage level and the sector pulse generator is enabled.

Figure 13:
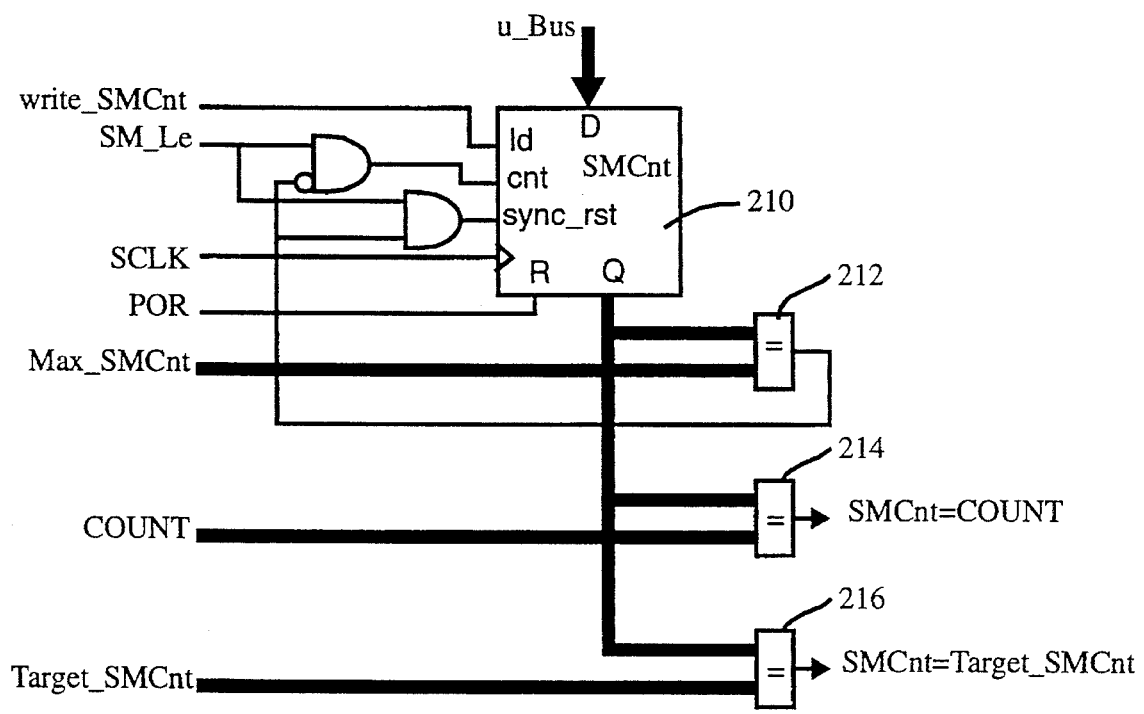
FIG. 13 illustrates the logic circuitry which keeps track of the servo mark count and compares it to the maximum servo mark count, to the predicted servo mark number when in fast forward mode and the number of the servo mark at the end of a frame when using the frame method.

FIG. 13 illustrates the logic circuitry which keeps track of the servo mark count SMCNT and compares it to the maximum servo mark count MAX_SMCNT, to the predicted servo mark number COUNT when in fast forward mode and the Target_SMCNT when using the frame method. The servo mark counter SMCNT 210 keeps track of the number of the servo mark last passed over by the system. The COUNT counter keeps track of the number of servo marks for which calculations have been performed when the system is in the fast forward mode. The number from the servo mark counter 210 is then compared with the maximum servo mark count allowed MAX_SMCNT by the comparator 212. When the number from the servo mark counter 210 is equal to the maximum servo mark count the output from the comparator 212 is used to reset the servo mark counter 210. The number from the servo mark counter 210 is also compared with the number of the predicted servo mark number COUNT when the system is in the fast forward mode by the comparator 214. When the number from the servo mark counter 210 is equal to the number of the predicted servo mark number COUNT the output of the comparator 214 notifies the system that it is now synchronized. The number from the servo mark counter 210 is also compared with the number of the servo mark at the beginning of the next frame Target_SMCNT when the system is using the frame method by the comparator 216. When the number from the servo mark counter 210 is equal to the number of the servo mark at the beginning of the next frame Target_SMCNT, the output of the comparator 216 notifies the system that it is at the beginning of a new frame.

Figure 14:
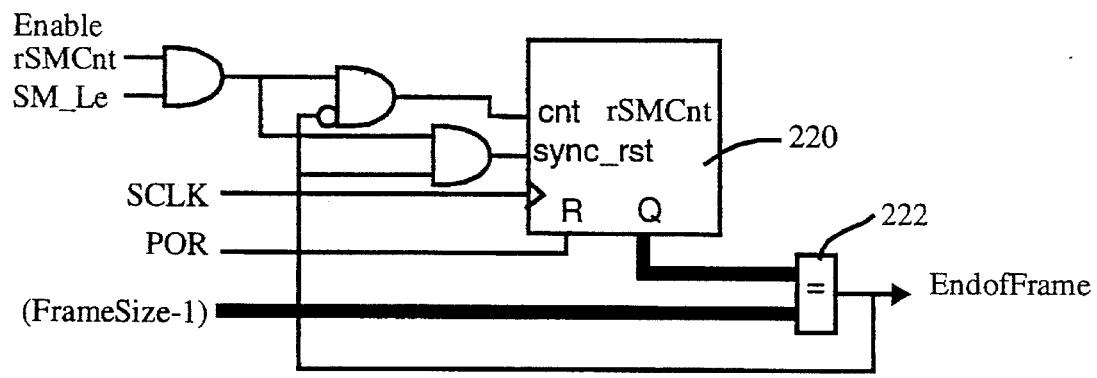
FIG. 14 illustrates the logic circuitry used to generate an end of frame flag.

FIG. 14 illustrates the logic circuitry used to generate an end of frame flag EOF. The counter rSMCNT 220 keeps track of the number of the servo mark within the frame. The number of the servo mark within the frame from the counter rSMCNT 220 is compared to the size of the frame minus one servo mark by the comparator 222. When the number of the servo mark within the frame from the counter rSMCNT 220 is equal to the size of the frame minus one servo mark, the output of the comparator 222 notifies the system that the end of the frame has been reached.

Figure 15:
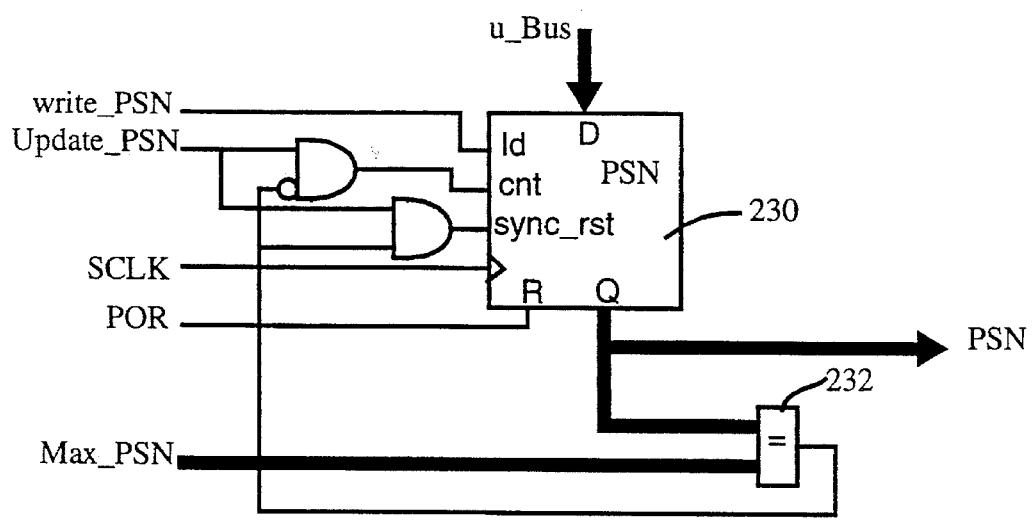
FIG. 15 illustrates the logic circuitry used to keep track of the physical sector number PSN and compare it to the maximum physical sector number.

FIG. 15 illustrates the logic circuitry used to keep track of the physical sector number PSN and compare it to the maximum physical sector number MAX_PSN. The physical sector number PSN counter 230 keeps track of the physical sector number PSN. The physical sector number is output from the counter to the system and is also compared with the maximum physical sector number MAX_PSN by the comparator 232. When the physical sector number PSN is equal to the maximum physical sector number MAX_PSN, the output from the comparator 232 is used to reset the counter 230.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

We claim:

1. An apparatus for automatic split field calculation in a magnetic media system using a magnetic media having a plurality of circular tracks, each track having a plurality of radial servo marks wherein one of the servo marks is an INDEX mark, wherein the media is rotated within the magnetic media system in relation to a read/write head for writing a sector to or reading a sector from one of a plurality of data regions, each region being positioned along one of the tracks between two adjacent servo marks such that each region has a capacity for storing a first plurality of information bits and wherein each sector includes a second plurality of information bits, the apparatus having a capability to synchronize for starting an operation at one of the servo marks without the necessity of waiting for the INDEX mark and comprising:

a. a counting circuit for storing a next predicted servo mark;
   b. a calculating logic circuit coupled to the counting circuit for calculating a number of sectors to be stored between the next predicted servo mark and an immediately subsequent servo mark and also before all servo marks in succession, wherein the number need not be an integer depending upon the relative sizes of the first and second pluralities of information bits; and
   c. a comparison circuit, coupled to receive the next predicted servo mark and a number of an actual servo mark head for initiating the operation if the next predicted servo mark is equal to the number of an actual servo mark or for incrementing the counting circuit if the next predicted servo mark and the number of the actual servo mark are not equal.

2. The apparatus as claimed in claim 1 wherein each sector comprises a plurality of fields, each of which can be split so that a first portion of the sector is stored before a servo mark and a second remaining portion of the sector is stored after a servo mark.

3. The apparatus as claimed in claim 2 wherein the plurality of fields within a sector includes a sector ID field, a data field, a first group of error check bytes and a second group of error check bytes.

4. The apparatus as claimed in claim 1 wherein a first time period required for calculating the number of sectors to be stored after the next predicted servo mark and before an immediately subsequent servo mark is less than a second time period consisting of a time that it takes the read/write head to travel from one servo mark to the next servo mark allowing multiple calculations to be performed between servo marks.

5. The apparatus as claimed in claim 1 further comprising a selecting logic circuit coupled to the calculating logic circuit and to the comparison circuit for allowing a user or system designer to select whether this system should wait for an INDEX mark before beginning the operation, wait for a beginning of a next frame before beginning the operation or proceed in fast forward mode and begin calculations from a next servo mark as if the system had detected an INDEX mark.

6. The apparatus as claimed in claim 5 wherein the sectors for each track can be grouped together in a frame, each frame consisting of N sectors and each track consisting of M frames and further wherein after every N sectors, a next sector must begin after the next servo mark.

7. The apparatus as claimed in claim 6 wherein the number of an actual servo mark detected by the read/write head is a number corresponding to that detected servo mark within the frame.

8. The apparatus as claimed in claim 1 wherein the disk storage system incorporates zone bit recording by dividing the media into a plurality of concentric recording zones, each zone having a different radial distance from the center of the media, with each greater radial distance zone having a higher bit density and greater storage capacity than a lesser radial distance zone.

9. The apparatus as claimed in claim 1 further comprising an automatic pulse generating circuit coupled to the comparison circuit for generating sector pulses when the next predicted servo mark is equal to the number of the actual servo mark.

10. The apparatus as claimed in claim 9 further comprising a control signal generating circuit coupled to the comparison circuit for generating control signals for splitting sectors.

11. The apparatus as claimed in claim 10 further comprising a selecting circuit coupled to the counting circuit, the calculating logic circuit and the comparison circuit for allowing the system to start on an INDEX mark or at a beginning of a next frame.

12. A method for automatic split field calculation in a magnetic media system using a magnetic media having a plurality of circular tracks, each track having a plurality of radial servo marks wherein one of the servo marks is an INDEX mark, wherein the media is rotated within the magnetic media system in relation to a read/write head for writing a sector to or reading a sector from one of a plurality of data regions, each region being positioned along one of the tracks between two adjacent servo marks such that each region has a capacity for storing a first plurality of information bits and wherein each sector includes a second plurality of information bits, the apparatus having a capability to synchronize for starting an operation at one of the servo marks without the necessity of waiting for the INDEX mark and comprising the steps of:

d. storing a next predicted servo mark;

e. calculating a number of sectors to be stored between the next predicted servo mark and an immediately subsequent servo mark and also before all servo marks in succession, wherein the number need not be an integer, depending upon the relative sizes of the first and second pluralities of information bits; and f. initiating the operation if the next predicted servo mark is equal to the number of an actual servo mark or for incrementing the next predicted servo mark if the next predicted servo mark and the number of the actual servo mark are not equal.

13. The method as claimed in claim 12 wherein the sector comprises a plurality of fields, each of which can be split so that a first portion of the sector is stored before a servo mark and a second remaining portion of the sector is stored after a servo mark.

14. The method as claimed in claim 13 wherein the plurality of fields within a sector includes a sector ID field, a data field, a first group of error check bytes and a second group of error check bytes.

15. The method as claimed in claim 14 further comprising the step of generating a sector pulse after the step of initiating the operation has been performed.

16. The method as claimed in claim 15 further comprising the step of generating a control signal for splitting sectors.

17. The method as claimed in claim 12 wherein a first time period required for calculating the number of sectors, to be stored after the next predicted servo mark and before an immediately subsequent servo mark is less than a second time period consisting of a time that it takes the read/write head to travel from one servo mark to the next servo mark allowing multiple calculations to be performed between servo marks.

18. The method as claimed in claim 12 further comprising the step of determining if the system should wait for an INDEX mark before beginning the operation, wait for a beginning of a next frame before beginning the operation or proceed in fast forward mode and begin calculations from a next servo mark as if the system had detected an INDEX mark.

19. The method as claimed in claim 12 further comprising the step of grouping the sectors together in a plurality of frames, each of the plurality of frames comprising N sectors and each track including M frames, the beginning of each frame starting after a servo mark.

20. The method as claimed in claim 19 wherein the number of an actual servo mark detected by the read/write head is a number corresponding to that detected servo mark within the frame.

21. A method for automatic split field calculation in magnetic media systems using media which have a plurality of circular tracks, each track having an INDEX mark, and a plurality of radial servo marks, wherein the media is rotated within the magnetic media system in relation to a read/write head, the method having the capability to start from any servo mark on the track without waiting for an INDEX mark and comprising the steps of:

a. calculating a number of sectors, including a split sector if necessary which could be stored after a servo mark and before a subsequent servo mark, beginning with the INDEX mark, regardless of whether an INDEX mark has been detected;

b. determining if the servo mark for which calculations have just been performed is the servo mark which was last passed by a read/write head;

c. calculating the number of sectors, including a split sector which could be stored after a next servo mark and before a subsequent servo mark;

d. repeating steps b and c until the servo mark for which calculations have just been performed is the servo mark which was last passed by a read/write head; and e. synchronizing the system by notifying a system controller that the servo mark for which calculations have just been performed is the servo mark which was last passed by a read/write head.

22. The method as claimed in claim 21 wherein the step of synchronizing includes the step of generating sector pulses.

23. The method as claimed in claim 22 further comprising the step of generating control signals for splitting sectors.

24. The method as claimed in claim 23 wherein the sector comprises a plurality of fields and the split sector can be split in any of the plurality of fields so that a first portion of the sector is stored before a servo mark and a second remaining portion of the sector is stored after a servo mark.

25. The method as claimed in claim 24 wherein the plurality of fields within a sector includes a sector ID field, a data field, a first group of error check bytes and a second group of error check bytes.

26. The method as claimed in claim 23 further comprising the step of determining if the system should wait for an INDEX mark, wait for a beginning of a next frame or proceed in fast forward mode and begin calculations from a next servo mark as if the system had detected an INDEX mark.

27. The method as claimed in claim 23 further comprising the step of grouping the sectors together in a plurality of frames, each of the plurality of frames comprising N sectors and each track including M frames, the beginning of each frame starting after a servo mark.

28. The method as claimed in claim 23 wherein the number of an actual servo mark detected by the read/write head is a number corresponding to that detected servo mark within the frame.

29. A method for automatic split field calculation in magnetic media systems using media which have a plurality of circular tracks, each track having an INDEX mark, and a plurality of radial servo marks, wherein the media is rotated within the magnetic media system in relation to a read/write head, the method comprising the steps of:

a. determining if the system has been designed to wait for an INDEX mark or the beginning of a next frame;

b. waiting for the INDEX mark or the beginning of the next frame if the system has been so designed;

c. calculating a number of sectors, including a split sector if necessary which could be stored after a servo mark and before a subsequent servo mark, beginning with the INDEX mark regardless of whether an INDEX mark has been detected, if the system has not been designed to wait for the INDEX mark or the beginning of the next frame;

d. determining if the servo mark for which calculations have just been performed is the servo mark which was last passed by a read/write head;

e. calculating the number of sectors, including a split sector which could be stored after a next servo mark and before a subsequent servo mark, if the system has not been designed to wait for the INDEX mark or the beginning of the next frame wherein each sector comprises a plurality of fields including a sector ID field, a data field, a first group of error check bytes and a second group of error check bytes and the split sector can be split in any of the plurality of fields so that a first portion of the sector is stored before a servo mark and a second remaining portion of the sector is stored after a servo mark;

f. repeating steps d and e until the servo mark for which calculations have just been performed is the servo mark which was last passed by a read/write head; and g. synchronizing the system by notifying a system controller that the servo mark for which calculations have just been performed is the servo mark which was last passed by a read/write head.

30. The method as claimed in claim 29 further comprising the step of grouping the sectors together in a plurality of frames, each of the plurality of frames comprising N sectors and each track including M frames, the beginning of each frame starting after a servo mark.

31. The method as claimed in claim 30 wherein the number of an actual servo mark detected by the read/write head is a number corresponding to that detected servo mark within the frame.

* * * * *

UNITED STATES PATENT AND TRADEMARK OFFICE
CERTIFICATE OF CORRECTION

PATENT NO. : 5,455,721

DATED : October 3, 1995

INVENTOR(S) : Nemazie et al.

It is certified that error appears in the above-identified patent and that said Letters Patent is hereby corrected as shown below:

In column 5, line 38, delete "FIG. 5" and replace with --FIGS. 5a-5d--

Figure 8A:
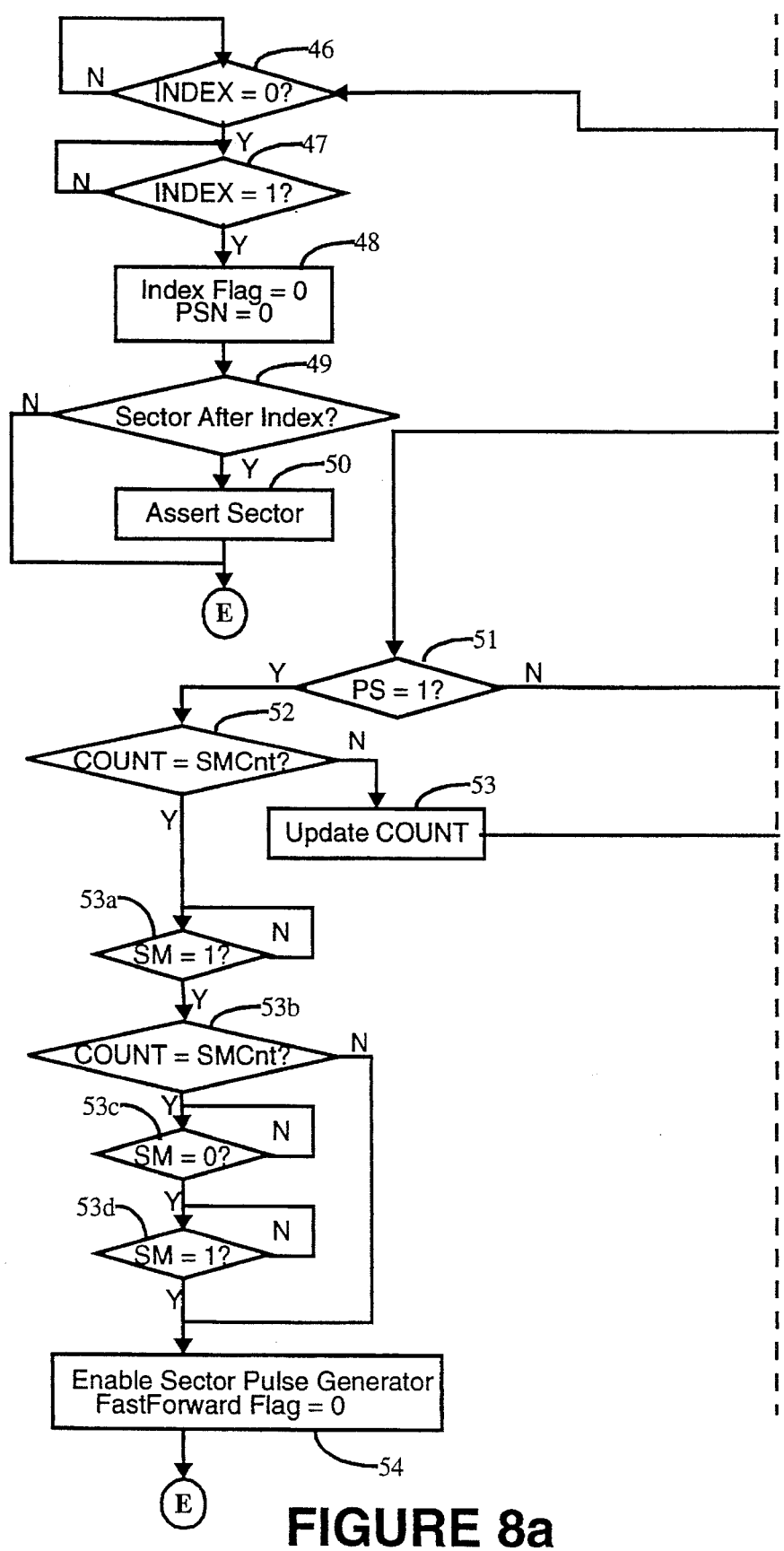
FIG. 8 illustrates a flow diagram for the subprogram D of the present invention.
Figure 8B:
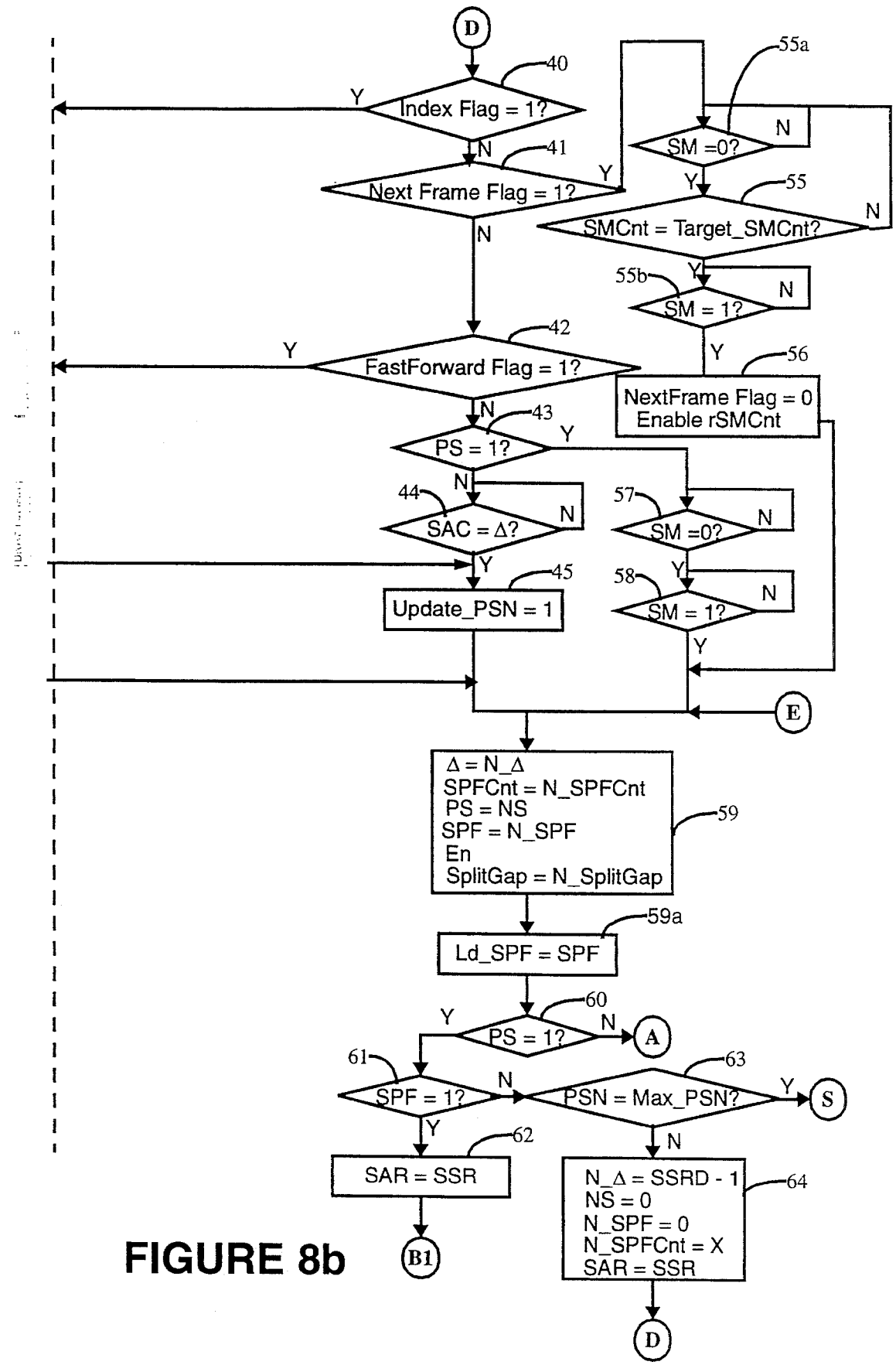

In column 5, line 45, delete "FIG. 8" and replace with --FIGS. 8a and 8b--

In column 5, line 46, after "invention." insert --The Figures 8a and 8b are illustrated so that the flow diagram is fully implemented by both Figures 8a and 8b joined together at the dotted line.--

In column 8, line 44, delete "FIG. 5 shows" and replace with --FIGS. 5a-5d show--

In column 10, line 13, delete "FIG. 8" and replace with --FIGS. 8a and 8b--

In column 12, lines 48-49, delete "FIG. 8" and replace with --FIGS.8a and 8b--

In column 14, line 50, delete "FIG. 8" and replace with --FIGS. 8a and 8b--

UNITED STATES PATENT AND TRADEMARK OFFICE
CERTIFICATE OF CORRECTION

PATENT NO. : 5,455,721
DATED : October 3, 1995
INVENTOR(S) : Nemazie et al.

It is certified that error appears in the above-indentified patent and that said Letters Patent is hereby corrected as shown below:

In column 15, line 3, delete "FIG. 8" and replace with --FIGS. 8a and 8b--

Signed and Sealed this

Twenty-seventh Day of February, 1996

Attest:

BRUCE LEHMAN

Attesting Officer   Commissioner of Patents and Trademarks